(12) United States Patent
Giera et al.

(10) Patent No.: US 12,247,829 B2
(45) Date of Patent: Mar. 11, 2025

(54) OPTIMAL PARAMETER SELECTION FOR STRUCTURED LIGHT METROLOGY

(71) Applicant: Lawrence Livermore National Security, LLC, Livermore, CA (US)

(72) Inventors: Brian Giera, Oakland, CA (US); Adam Jaycox, Broomfield, CA (US); Brian Au, El Mont, CA (US); Alex Caviness, Oakland, CA (US); Alexander Blum, Livermore, CA (US); Nishant Ojal, Livermore, CA (US)

(73) Assignee: LAWRENCE LIVERMORE NATIONAL SECURITY, LLC, Livermore, CA (US)

( * ) Notice: Subject to any disclaimer, the term of this patent is extended or adjusted under 35 U.S.C. 154(b) by 96 days.

(21) Appl. No.: 18/104,198

(22) Filed: Jan. 31, 2023

(65) Prior Publication Data

US 2024/0255415 A1    Aug. 1, 2024

(51) Int. Cl.
*G01B 11/25*     (2006.01)
*G01N 21/01*     (2006.01)
*G01N 21/17*     (2006.01)

(52) U.S. Cl.
CPC ............. *G01B 11/25* (2013.01); *G01N 21/01* (2013.01); *G01N 2021/1734* (2013.01);
(Continued)

(58) Field of Classification Search
CPC ....... G01B 11/002; G01B 11/24; G01B 11/25; G01B 11/2504; G01B 11/2513;
(Continued)

(56) References Cited

U.S. PATENT DOCUMENTS

| 6,323,776 B1 | 11/2001 | Jackson et al. |
| 6,510,244 B2 | 1/2003 | Proesmans et al. |

(Continued)

FOREIGN PATENT DOCUMENTS

| CN | 108827184 A | * | 11/2018 | ............. G01B 11/24 |
| CN | 114638795 A | * | 6/2022 | |

(Continued)

OTHER PUBLICATIONS

Li, S., Da, F., Rao, L. (2017). Adaptive fringe projection technique for high-dynamic range three-dimensional shape measurement using binary search. Optical Engineering, 56 (9), 094111.

(Continued)

*Primary Examiner* — Gordon J Stock, Jr.
(74) *Attorney, Agent, or Firm* — Perkins Coie LLP

(57) ABSTRACT

A method is disclosed for selecting an optimal value for an adjustable parameter of a structured light metrology (SLM) system, for scanning an object. The SLM system performs test scans of the object to acquire a plurality of sets of measurements of the object, wherein a different value is used for the parameter for each test scan. For each test scan, a value of a quality metric is calculated, based on the set of measurements of the object associated with the test scan and simulation data representing a simulated scan of the object by the SLM system. A test scan is then identified that has a quality metric value that satisfies a specified optimization criterion; and a value of the adjustable parameter that was used for the identified test scan is selected as the optimal value of the adjustable parameter, for scanning the object.

21 Claims, 9 Drawing Sheets

(52) U.S. Cl.
CPC ............... *G01N 2021/1785* (2013.01); *G01N 2201/0675* (2013.01); *G01N 2201/11* (2013.01)

(58) Field of Classification Search
CPC ............ G01B 11/2518; G01B 11/2545; G01B 11/254; G01B 11/2522; G01B 11/2527; G01B 11/30; G01B 11/303; G01B 11/306; G03F 7/70605; G03F 7/706837; G03F 7/706839; G01N 21/01; G01N 21/8851; G01N 21/8806; G01N 21/8901; G01N 2021/8832; G01N 2021/8829; G01N 2021/1734; G01N 2021/1757; G01N 2021/1785; G01N 2201/11; G01N 2201/0675

See application file for complete search history.

(56) References Cited

U.S. PATENT DOCUMENTS

| | | | | |
|---|---|---|---|---|
| 7,724,379 | B2* | 5/2010 | Kawasaki | G06T 7/80 |
| | | | | 356/603 |
| 7,826,072 | B1* | 11/2010 | Wack | G01B 11/24 |
| | | | | 700/121 |
| 8,837,026 | B2* | 9/2014 | Fisker | G06T 17/00 |
| | | | | 703/1 |
| 10,310,922 | B2* | 6/2019 | Huang | H04N 1/00 |
| 10,485,425 | B2* | 11/2019 | Krishnaswamy | A61B 5/0075 |
| 11,317,078 | B2* | 4/2022 | Zhang | G01B 11/25 |
| 11,385,184 | B2* | 7/2022 | Chehaiber | G06T 7/0004 |
| 11,582,399 | B2* | 2/2023 | Matsuda | G01B 11/2518 |
| 11,748,551 | B2* | 9/2023 | Chao | G03F 7/70491 |
| | | | | 430/30 |
| 11,788,972 | B2* | 10/2023 | Hsia | G05B 19/41875 |
| | | | | 356/237.1 |
| 2019/0287232 | A1* | 9/2019 | Brauer | G06T 5/70 |
| 2021/0356259 | A1 | 11/2021 | Fu et al. | |

FOREIGN PATENT DOCUMENTS

| | | | | |
|---|---|---|---|---|
| CN | 115628701 | A | * | 1/2023 |
| JP | 2014032159 | A | | 2/2014 |
| KR | 20120000234 | A | | 1/2012 |
| KR | 20200014438 | A | * | 2/2020 |
| WO | 2014078015 | A1 | | 5/2014 |
| WO | WO-2018225406 | A1 | * | 12/2018 ............ G01B 11/30 |

OTHER PUBLICATIONS

Rachakonda, P., Muralikrishnan, B., Sawyer, D. (2019). Sources of errors in structured light 3d scanners. Dimensional optical metrology and inspection for practical applications viii (vol. 10991, pp. 25-37).

Rao, L., & Da, F. (2018). High dynamic range 3d shape determination based on automatic exposure selection. Journal of Visual Communication and Image Representation, 50, 217-226.

Salahieh, B., Chen, Z., Rodriguez, J.J., Liang, R. (2014). Multi polarization fringe projection imaging for high dynamic range objects. Optics express, 22 (8), 10064-10071.

Tang, S., Zhang, X., Li, C., Gu, F. (2019). High dynamic range three-dimensional shape reconstruction via an auto-exposure-based structured light technique. Optical Engineering, 58 (6), 2019.

Wang, M., Du, G., Zhou, C., Zhang, C., Si, S., Li, H., Li, Y. (2017). Enhanced high dynamic range 3d shape measurement based on generalized phase-shitting algorithm. Optics Communications, 385, 43-53.

International Search Report and Written Opinion Received in Application No. PCT/US24/11879, dated May 27, 2024, 10 pages.

* cited by examiner

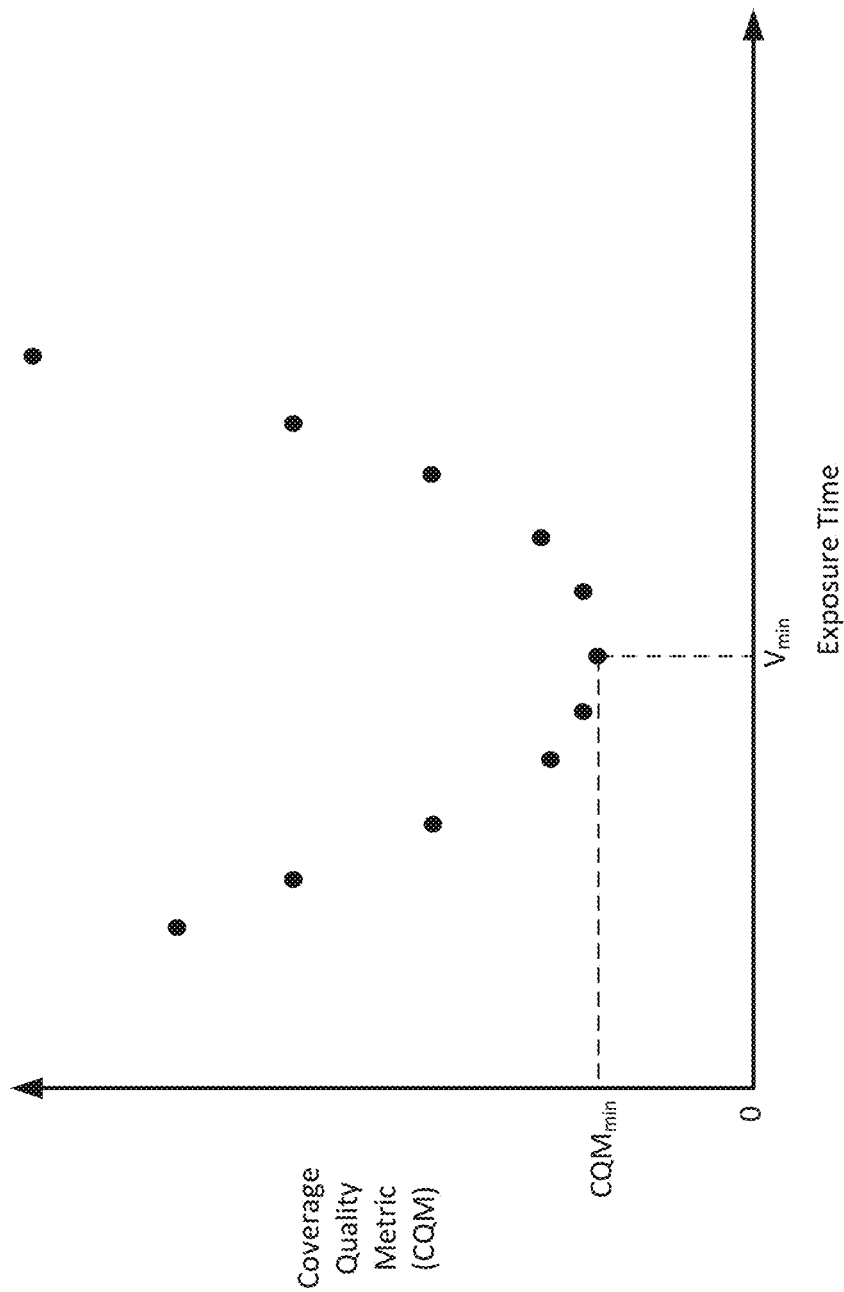

800

Perform, by the SLM system, a plurality of test scans of the object to acquire a plurality of sets of measurements of the object, wherein a different value is used for the adjustable parameter for each of the test scans
801

↓

For each test scan of the plurality of test scans, calculate a value of a quality metric, based on the set of measurements of the object associated with the test scan and a set of simulation data representing a simulated scan of the object by the SLM system
802

↓

Identify a test scan, of the plurality of test scans, that has a quality metric value that satisfies a specified optimization criterion
803

↓

Select the value of the adjustable parameter that was used for the identified test scan, as the optimal value of the adjustable parameter for scanning the object
804

FIG. 8

OPTIMAL PARAMETER SELECTION FOR STRUCTURED LIGHT METROLOGY

STATEMENT REGARDING FEDERALLY SPONSORED RESEARCH

This invention was made with Government support under Contract No. DE-AC52-07NA27344 awarded by the United States Department of Energy. The Government has certain rights in the invention.

TECHNOLOGY FIELD

The present invention generally pertains to structured light metrology (SLM), and more particularly, to a technique for determining an optimal value for a parameter of an SLM system.

BACKGROUND

Structured light metrology (SLM) is a technique in which projected light patterns (structured light) and a camera system are used to precisely and efficiently measure the three-dimensional (3D) shape of an object. However, conducting measurements through SLM systems often requires a time-intensive manual setting of the input measurement parameters, that may not apply to a wide range of objects. Additional complexity is added by the dependence of the quality of measured data obtained from structured light scanners on various factors, such as the object's shape, surface roughness, exposure time, projected fringe pattern, ambient light, temperature, etc. Exposure time in particular is a very important parameter in SLM, since under exposure or overexposure of the object to be scanned can cause loss of coverage of the object, resulting in poor measurement quality.

The current approach to measurement with commercial structured light scanners is a manual process of repeating a sequence of tasks, including changing the exposure time, conducting the scan to obtain a measurement dataset, and then using a subjective assessment of that dataset to alter the input parameters manually. This process is not only tedious, but also the subjective assessment of the measured dataset may not lead to an optimal measurement dataset.

BRIEF DESCRIPTION OF THE DRAWINGS

One or more embodiments of the present invention are illustrated by way of example and not limitation in the figures of the accompanying drawings, in which like references indicate similar elements.

FIG. 5 is a graph showing an example of the relationship between exposure time and CQM from performing multiple scans of an object with exposure time set to different values.

FIG. 8 is a flow diagram illustrating an example of an overall process in accordance with the technique introduced here.

DETAILED DESCRIPTION

Figure 1:
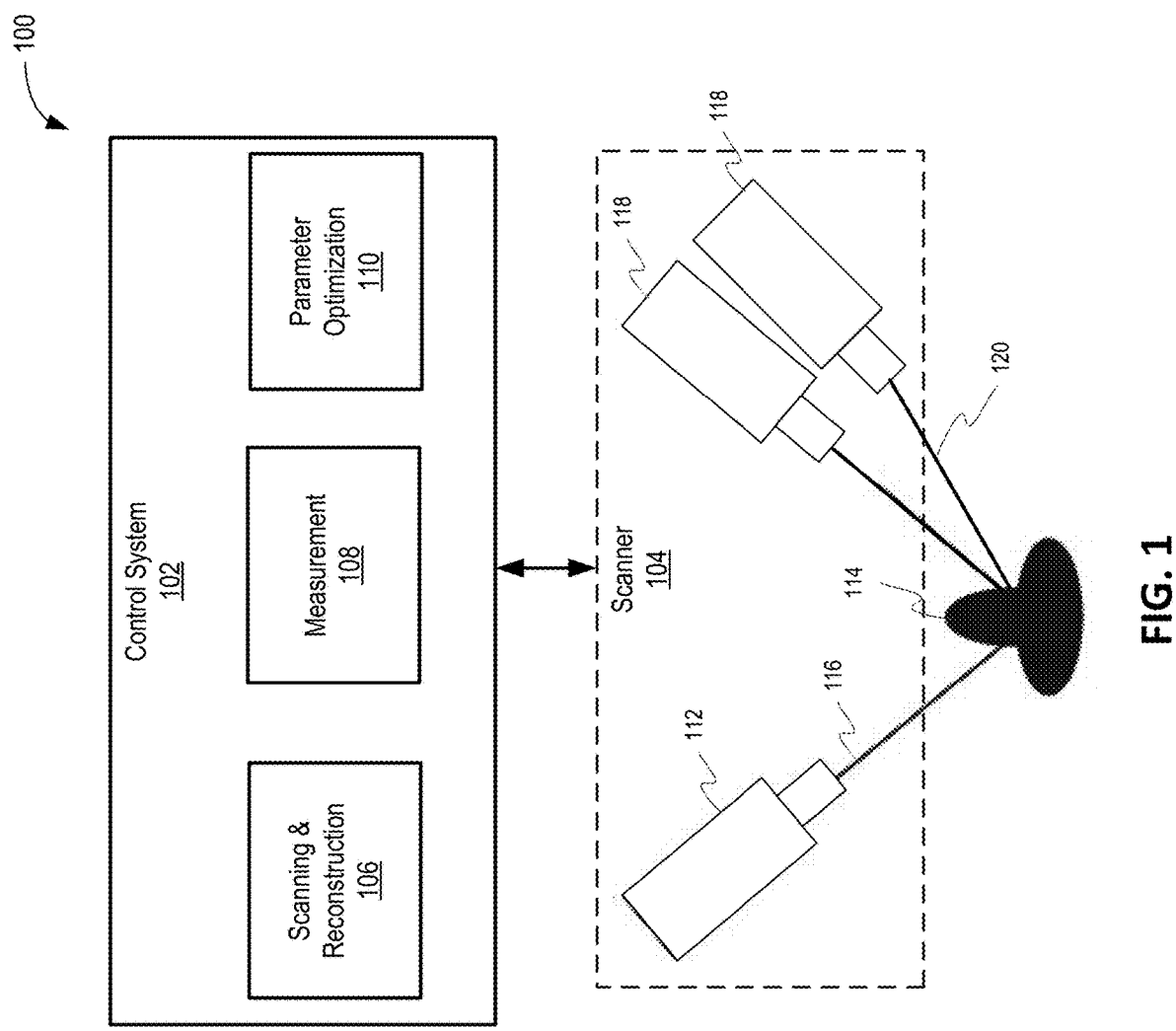
FIG. 1 illustrates an example of an SLM system.

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

To automate setting of input parameters of an SLM system, such as the exposure time, researchers may rely on correcting saturation and low contrast observed during measurements. Techniques to improve reconstruction accuracy include improved coding, scheme-based techniques, hardware assisted techniques, adaptive fringe projection techniques, and multi-exposure based techniques. All of these techniques rely on modification of the structured light being used, such as changing the coding pattern or shifting the phase. Consequently, these techniques require specific calibration procedures and control of the hardware used for achieving this change. Empirical determination of the exposure times is another shortcoming of these techniques.

To address these shortcomings, introduced here is a technique to select an optimal value for an adjustable parameter of an SLM system, for scanning an object to be measured (the "target object") by the SLM system. This is achieved at least partly by using a defined coverage quality metric to evaluate measurement datasets. The parameter can be, for example, the exposure time for scanning the target object. Exposure time is one of the most important input parameters impacting measurement quality in SLM in terms of target object coverage. The technique automates a robust search for an optimal value of the parameter (e.g., exposure time) with minimal human intervention and judgement.

In the technique, simulation data representing a simulated scan of the object by the SLM system is generated based on a digital model of the target object, such as a computer aided design (CAD) model of the object. During a setup phase, the SLM system performs multiple test scans of the object, to acquire sets of measurements of the object, where a different value is used for the parameter for each test scan. For each test scan, a value of a quality metric is computed, based on the set of measurements of the object associated with the test scan and the simulation data. The test scan that has the best value of the quality metric is identified, and the value of the adjustable parameter that was used for that test scan is selected as the optimal value of the parameter, for scanning the object. The object (or a copy of it) can then be scanned by the SLM system during a production phase with the adjustable parameter set to the optimal value, to acquire measurements of the object. In at least some applications, the target object scanned during the setup phase is an ideal prototype, such as a CAD representation or gold standard version of the object, while the target object scanned during the production phase is a copy that is intended to be, but is not necessarily, identical to the ideal prototype, and the purpose of the production phase is to measure how closely the object being scanned matches the ideal prototype scanned during the setup phase.

The simulation data includes multiple simulation points, and each set of measurements includes multiple measurement points. The quality metric value for any particular test scan can be, for example, (or can be a function of) the average of all of the distances between each simulation point and the measurement point from that particular test scan that is nearest to that simulation point. The best value of the quality metric can therefore be the lowest value, corresponding to the shortest average distance between the associated scan's measurement points and closest simulation points.

In at least some embodiments, the simulation data can be generated by ray tracing from each camera of the SLM scanner towards the target object, and taking the intersections of the rays with the digital model of the part as the simulation points. More specifically, the simulation data can be generated by a process that includes: 1) accessing the digital model of the target object to generate a virtualization of the target object, where the virtualization is a virtual representation of the target object based on the digital model; 2) accessing camera data indicative of physical parameters of the cameras of the SLM system; 3) tracing rays from each camera of the plurality of cameras towards the virtualization of the target object, based on the camera data, where the virtualization is located (virtually) at an expected measurement location relative to the SLM system; 4) identifying intersections of the rays with the virtualization of the target object; and 5) selecting the intersections of the rays with the virtualization of the target object as the simulation data.

In some situations, a combination of two or more scans with the parameter set to different values may produce the best result. Accordingly, in some embodiments, the technique identifies two or more test scans that, in combination, produce the best quality metric value.

To facilitate description, the adjustable parameter is generally assumed herein to be exposure time, although the technique can also be applied to select the optimal value for essentially any other adjustable parameter, such as parameters relating to texture models, camera angle, lighting, etc. Other details of the technique introduced here will become apparent from the description which follows.

FIG. 1 illustrates an example of an SLM system in which the technique introduced here can be implemented. The SLM system 100 includes a control system 102 and a scanner 104. The scanner 104 includes a structured light source 112 to emit structured laser light 116 toward a target object 114, and multiple cameras 118 to detect the reflections 120, from the target object 114, of light 116 emitted by the structured light source 112.

The control system 102 includes a scanning and reconstruction module 106, a measurement module 108 and a parameter optimization module 110. The scanning and reconstruction module 106 is responsible for controlling operation of the light source 112 and cameras 118 and the relative positioning of the object relative to the light source 112 and cameras 118 (e.g., by rotating a platform on which the object is placed), and for acquiring image data from the cameras 118. The measurement module 108 is responsible for computing physical measurements of the target object 114 based on the reconstructed image data.

The parameter optimization module 110 implements at least some aspects of the technique introduced here, by performing the machine-implemented control and computational operations associated with determining the optimal value of a parameter, such as exposure time. As stated above, in the technique introduced here, a set of simulation data associated with the target object 114 is used in determining the optimal parameter value. The simulation data provides insights into how real-world measurements can be conducted for any given orientation of a given target object, relative to a given SLM system. The simulation data is generated based on a digital model of the target object and known physical characteristics of the SLM system. Hence, the simulation data will be unique for any particular combination of SLM system and target object. The digital model of the target object is data that defines a virtualization of the target object. For purposes of creating the simulation data, the virtualization of the target object is assumed to be located and oriented at the same location and orientation, respectively, at which a real version of the target object would be placed during actual scanning, relative to the scanner.

Figure 2:
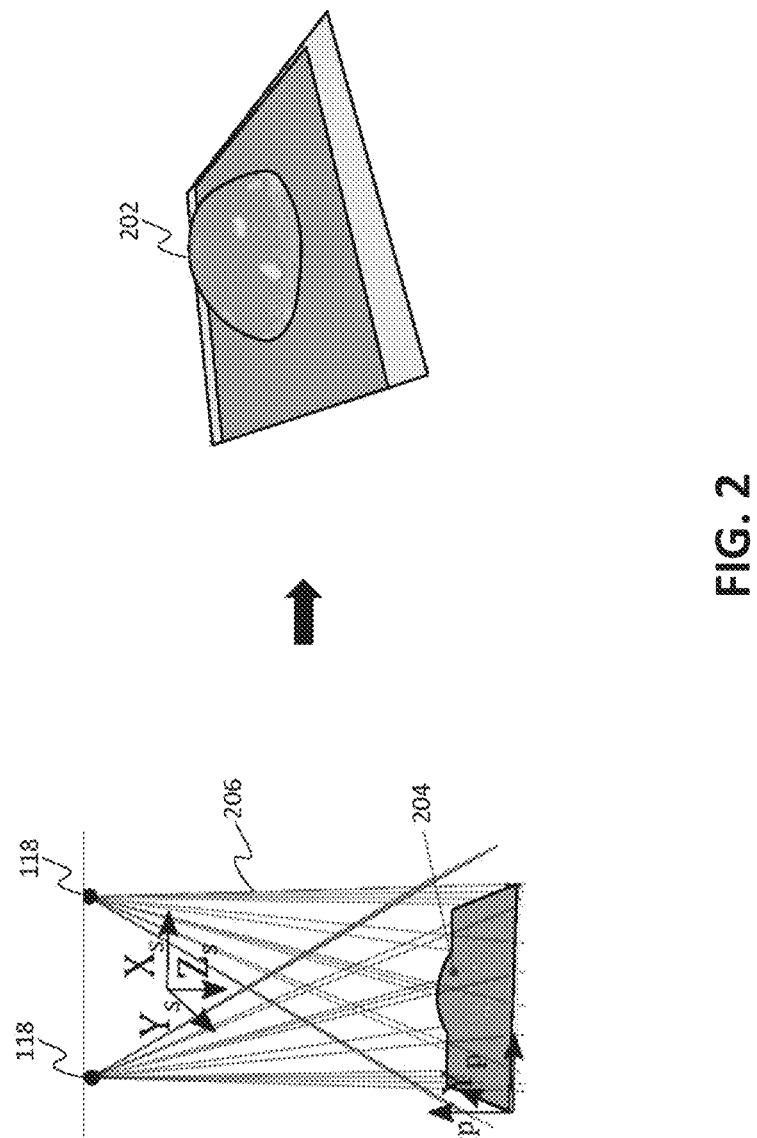
FIG. 2 illustrates how a set of simulation data associated with the SLM system and a target object can be generated.

In at least some embodiments, as illustrated in FIG. 2, the simulation dataset 202 can be generated by ray tracing from each camera 118 of the SLM scanner towards the virtualization 204 of the target object 114, and taking the intersections of the rays 206 from both cameras with the virtualization 204 as the data points (simulation points) of the simulation dataset 202. The number of rays traced can be based on the number of pixels for a given camera. For example, for 12 megapixel cameras, 12 million rays can be traced from each camera. The directions of the rays can be limited by the field of view (FOV) of the camera. The FOV of a camera can be divided into a rectangular grid of the total number of pixels of the camera, where the rays point from the camera to the center of the grid. The size of the grid can be proportional to the FOV in each of the two planar directions (x and y).

Note that the actual number of points in the simulated data will be less than the resolution of the cameras. This is because of the fact the not all simulated rays from the camera intersect the part, depending upon the size and shape of the part and its orientation relative to the cameras.

The coordinate frames of the scanner 104 and the target object 114 should be aligned for utilization of the simulated data. The measured datasets from the actual and simulated environments are collected in distinct coordinate frames, as shown in FIG. 2. The measurement data is in the scanner's coordinate frame (represented by the subscript 's') and the simulated data is with respect to the target object's coordinate frame (represented by the subscript 'p'). The transformation relationship (both rotation and translation) between these frames is important to aligning simulated data with the measured data. Use of reference markers pasted at some known positions in the part coordinate frame allows for the calculation of this transformation. The scanner 104 can scan these reference markers, and hence the positions of these markers are known in the scanner's coordinate frame. A transformation matrix can be calculated using the positions of these known references in two coordinate frames. For unique determination of the transformation matrix, at least three reference markers are used. By using this matrix, the simulated data is transformed into the scanner's coordinate frame, and then the measurement data can be evaluated for quality with reference to the simulated data.

In at least some embodiments, the optimal parameter value is determined by applying a coverage quality metric (CQM) to the simulation data and test measurement data. The CQM quantifies the quality of measured datasets by evaluating the datasets against the simulation dataset. In at least some embodiments, the quality of a measurement dataset is proportional to the fraction of the object's surface covered by the measured dataset relative to the simulation dataset. Accordingly, in at least some embodiments, measurement quality improves with decreasing values of COM.

Figure 3:
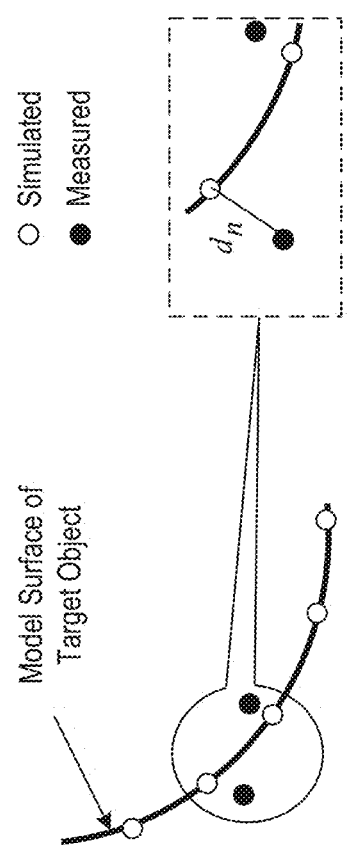
FIG. 3 illustrates schematically a process of calculation of a coverage quality metric (CQM) for a set of measured data points.

FIG. 3 schematically illustrates the process of calculation of the CQM, according to at least one embodiment. For each simulation point in the simulation dataset, the corresponding nearest measurement point is identified. The separation distance between these two points is then calculated and denoted as dn, where the subscript n denotes the nth simulation point. In at least some embodiments, the CQM is calculated as:

$$CQM = \frac{1}{N}\sum_{n=1}^{N} dn$$

where N is the total number of simulation points.

Figure 4A:
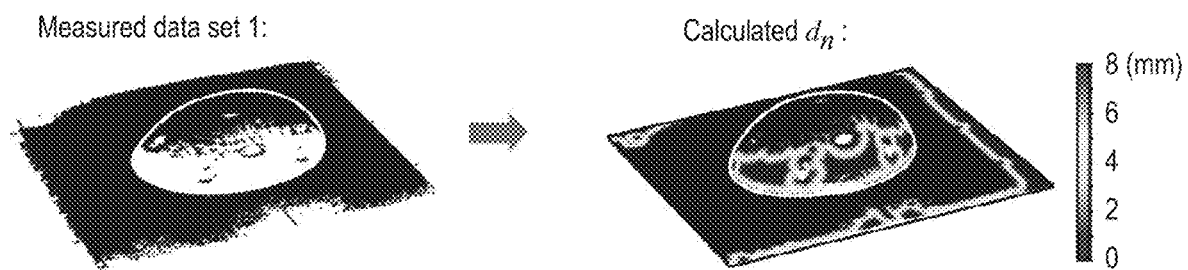
FIG. 4A illustrates an example of a first measured data set and corresponding distance parameter, dn, for a large value of CQM.
Figure 4B:
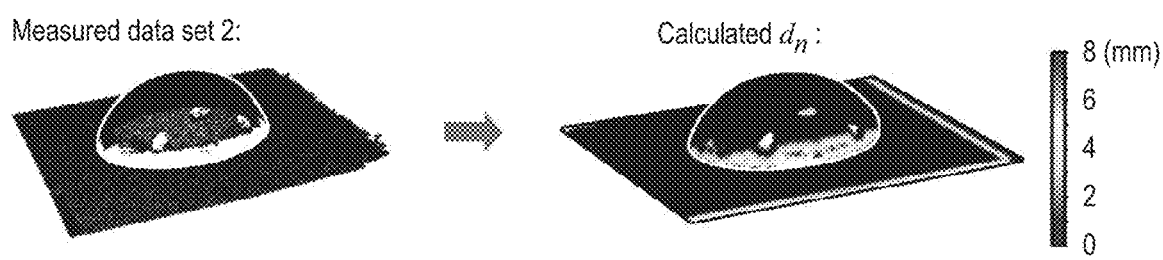
FIG. 4B illustrates an example of a second measured data set and corresponding distance parameter, dn, for a small value of CQM.

FIGS. 4A and 4B show the measurement dataset having large and small values of the CQM, respectively, for a simple target object having the shape of a semi-ovoid placed with its flat surface facing downward. Assuming the parameter to be optimized is exposure time, measurement dataset 1 in FIG. 4A is an example of an overexposed measurement, where measurement data towards the base of the object is clearly missing. In this region, the measured points are located farther from the corresponding simulation points, as characterized by a greater value of dn. These large values of dn result in the large value of the CQM. In contrast, measurement dataset 2 in FIG. 4B has better part coverage, resulting in smaller values of dn, and hence, a smaller value of the CQM. For an ideal case, where there is no missing measured data, the measurement dataset will be same as the simulation data. In that case, the values of dn will be zero and hence the CQM will be zero.

As noted, one advantageous application of the technique introduced here is to automate substantially the selection of optimal exposure time for the measurements, since exposure time is one of the most important input parameters impacting measurement quality in terms of part coverage. To accomplish this, for a given object, multiple scans to acquire test measurements are performed on the object, where exposure time (or any other parameter) is systematically modified so as to be different for each scan. The scanned data includes the combined measurement data from each of the cameras. Each separate scan produces multiple measurement points and one corresponding CQM value.

FIG. 5 is a graph illustrating an example of the resulting relationship between the exposure time and COM for a series of test scans of a simple object (for example, the semi-ovoid discussed above) after performing these scans. Note the drop in coverage, represented by high CQM values, due to underexposure on the left side of the curve (i.e., due to exposure time being too low) and due to overexposure on the right side of the curve (i.e., due to exposure time being too high). Hence, an optimal exposure time can be estimated from the CQM, which is an indication of coverage of object's surface area by the measured data. The lowest value $CQM_{min}$ of the computed COM for the multiple sweeps (i.e., multiple sets of test measurements/configurations) represents the best measurement configuration, including the optimal value $V_m$ of (in this example) exposure time.

Figure 6:
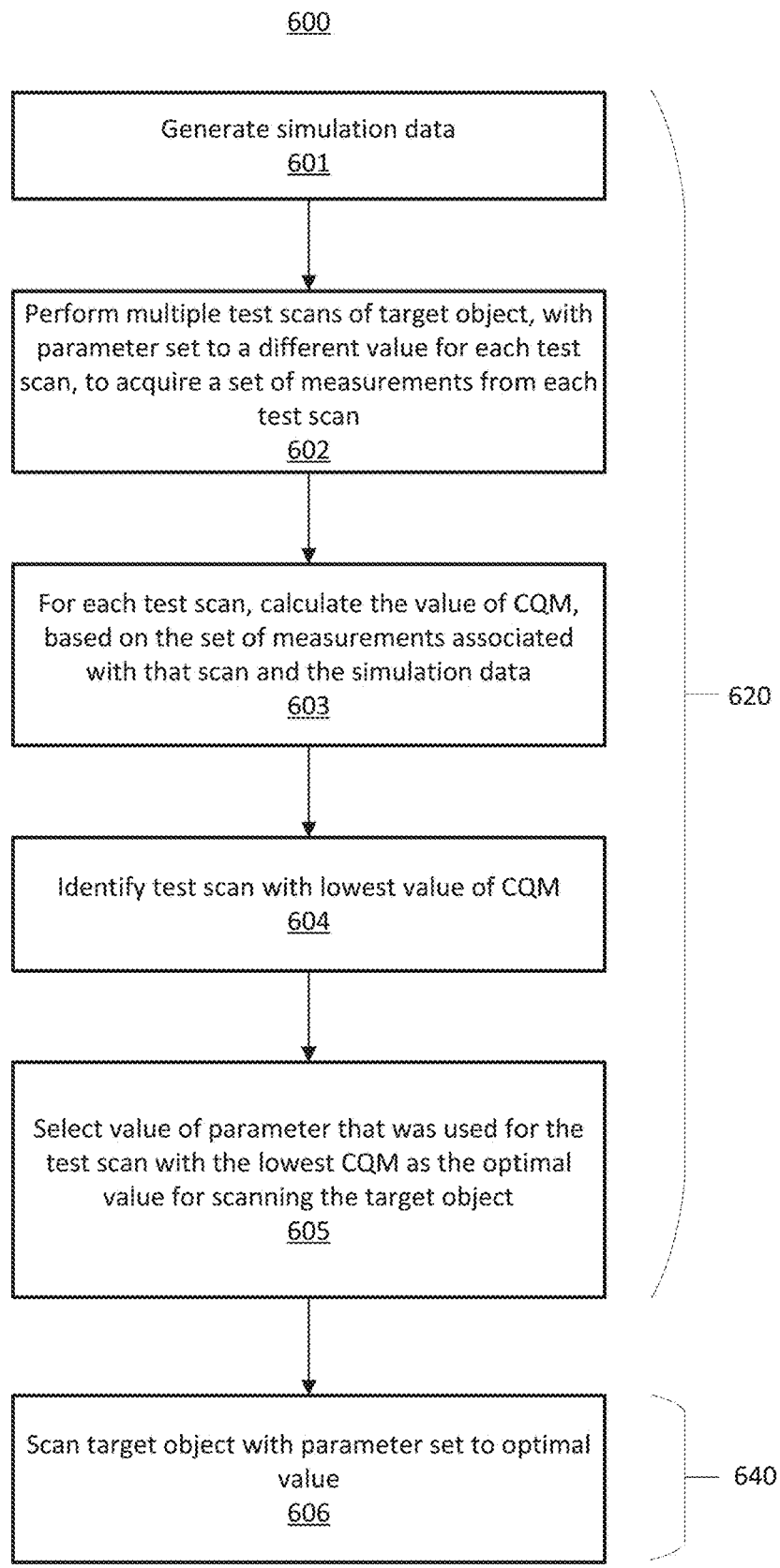
FIG. 6 is a flow diagram illustrating an example of a process for determining and setting the optimal value of an adjustable parameter of an SLM system.

FIG. 6 illustrates an example of a process in accordance with the technique introduced here, for determining and setting the optimal value of an adjustable parameter (such as exposure time) of an SLM system. The process 600 may be performed by an SLM system, such as SLM system 100 in FIG. 1. The process 600 includes a set-up phase 620 and a production phase 640.

The set-up phase 620 includes steps 601 through 605, at least some of which can be performed by the parameter optimization module 110 (FIG. 1) of the SLM system, for example. Initially, in the set-up phase 620, the process 600 generates the simulation dataset at step 601, as described above. Next, at step 602, the SLM system performs multiple test scans of the target object, with the parameter set to a different value for each test scan, to acquire a set of measurements from each test scan. In step 603, for each test scan, the process 600 calculates the value of the CQM, based on the set of measurements associated with that scan and the simulation data. The process then identifies at step 604 the test scan with lowest value of CQM. At the end of the set-up phase 620, at step 605 the process 600 selects the value of the parameter that was used for the test scan with the lowest COM, as the optimal value for scanning the target object. In some implementations, step 605 can be performed manually by a person. In some instances, the person may wish to adjust the optimal value produced by the system before programming the system with it. Subsequently, in the production phase 640, the SLM system scans the target object (or, more likely, a copy of it) at step 606 with the exposure time set to the optimal value.

Figure 7:
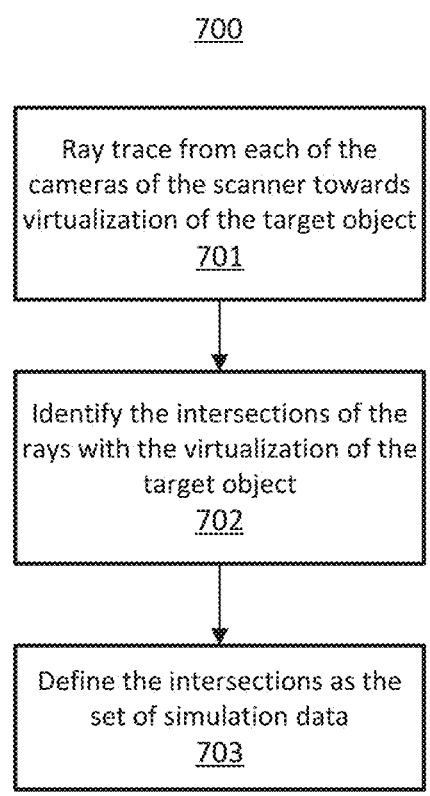
FIG. 7 is a flow diagram illustrating a process for generating the simulation data.

FIG. 7 illustrates a process 700 representing an example of the details of step 601 in FIG. 6, i.e., the generation of simulation data. Initially, at step 701 the process ray traces from each of the cameras of the scanner towards a virtualization of the target object that is based on the digital model of the target object. At step 702 the process identifies the intersections of the traced rays with the virtualization of the target object. Then, at step 703 the process defines the intersections of the rays with the virtualization as the set of simulation data.

FIG. 8 illustrates another example of a process that can be performed according to an embodiment of the technique introduced here. At step 801, the process 800 performs, by an SLM system, a plurality of test scans of an object (e.g., the target object) to acquire a plurality of sets of measurements of the object, wherein a different value is used for the adjustable parameter for each of the test scans. At step 802, for each test scan of the plurality of test scans, the process 800 calculates a value of a quality metric, based on the set of measurements of the object associated with the test scan and a set of simulation data representing a simulated scan of the object by the SLM system. At step 803, the process 800 identifies a test scan, of the plurality of test scans, that has a quality metric value that satisfies a specified optimization criterion (for example, that has the lowest value of the quality metric). At step 804, the process 800 selects the value of the adjustable parameter that was used for the identified test scan, as the optimal value of the adjustable parameter for scanning the object.

In practical applications, using a single exposure time may not always lead to good measurement data in terms of a particular target object's scan area coverage, especially for multi-material target objects with large surface reflectivity variations. In such cases, a combination of two or even three exposure times can be used during the measurement. The technique introduced here can account for two or more exposure times for a given target object. This can be achieved, for example, by generating a set of measurement data for all pairwise combinations of the exposure times used while scanning and then evaluating the combinations using the CQM. For this particular measurement, the COM is evaluated for each of the combined datasets. Using this technique, it may be found during the setup phase that the lowest CQM value corresponds to the combination of measurements with, for example, exposure times of 8 milliseconds and 300 milliseconds. Such a result would indicate that the best coverage of the target object (or any physical copy of the target object) during the production phase can be obtained by performing two separate scans—one with exposure time set to 8 milliseconds and the other with exposure time set to 300 milliseconds—and using the combined measurement data from both scans.

Figure 9:
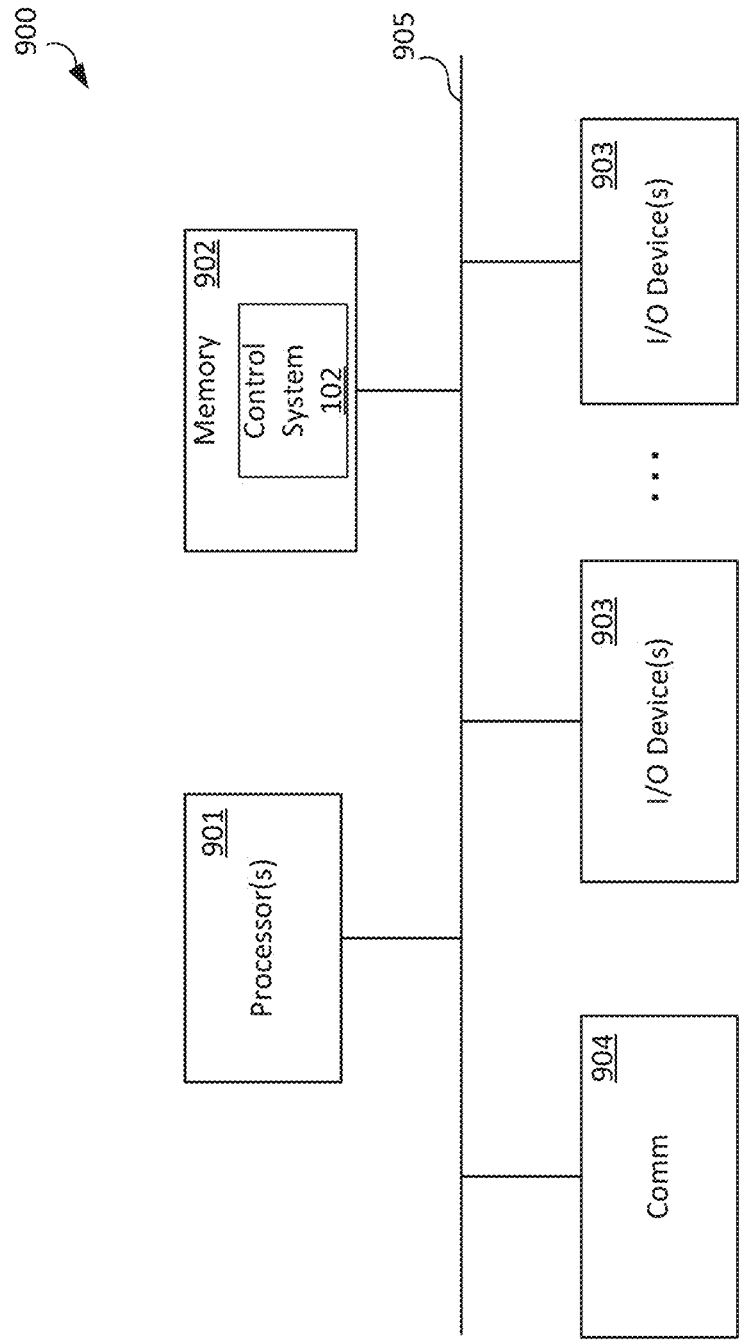
FIG. 9 is a block diagram illustrating an example of a processing system in which at least some aspects of the technique introduced here can be implemented.

FIG. 9 is a block diagram illustrating an example of a computer system 900 in which at least some aspects of the technique introduced here can be implemented, including, for example, generation of the simulation data set, control of the SLM scanner, calculation of the CQM, and determination of the optimal parameter value. For example, the parameter optimization module 110 in FIG. 1 can be implemented as hardwired circuitry, or appropriately programmed programmable circuitry, or a combination thereof, in the computer system 900.

The computer system 900 includes one or more processors 901, one or more memories 902, one or more input/output (I/O) devices 903, and one or more communication interfaces 904, all connected to each other through an interconnect 905. The processor(s) 901 control the overall operation of the computer system 100, including controlling its constituent components. The processor(s) 901 may be or include one or more conventional microprocessors, programmable logic devices (PLDs), field programmable gate arrays (FPGAs), application-specific integrated circuits (ASICs), etc. The one or more memories 902 store data and executable instructions (e.g., software and/or firmware), which may include software and/or firmware for performing the techniques introduced above. The one or more memories 902 may be or include any of various forms of random access memory (RAM), read-only memory (ROM), volatile memory, nonvolatile memory, or any combination thereof. For example, the one or more memories 902 may be or include dynamic RAM (DRAM), static RAM (SDRAM), flash memory, one or more disk-based hard drives, etc. The I/O devices 903 provide access to the computer system 900 by human user, and may be or include, for example, a display monitor, audio speaker, keyboard, touch screen, mouse, microphone, trackball, etc. The communications interface 904 enables the computer system 900 to communicate with one or more external devices (e.g., an SLM scanner) via a network connection and/or direct connection. The communications interface 904 may be or include, for example, a Wi-Fi adapter, Bluetooth adapter, Ethernet adapter, Universal Serial Bus (USB) adapter, or the like. The interconnect 905 may be or include, for example, one or more buses, bridges or adapters, such as a system bus, peripheral component interconnect (PCI) bus, PCI extended (PCI-X) bus, USB, or the like.

Unless contrary to physical possibility, it is envisioned that (i) the methods/steps described herein may be performed in any sequence and/or in any combination, and that (ii) the components of respective embodiments may be combined in any manner.

The machine-implemented computational and control operations described above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), system-on-a-chip systems (SOCs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method of selecting an optimal value for an adjustable parameter of a structured light metrology (SLM) system, for scanning an object, the method comprising:
    performing, by the SLM system, a plurality of test scans of the object to acquire a plurality of sets of measurements of the object, wherein a different value is used for the adjustable parameter for each of the test scans;
    for each test scan of the plurality of test scans, calculating a value of a quality metric, based on the set of measurements of the object associated with the test scan and a set of simulation data representing a simulated scan of the object by the SLM system;
    identifying a test scan, of the plurality of test scans, that has a quality metric value that satisfies a specified optimization criterion; and
    selecting a value of the adjustable parameter that was used for the identified test scan, as the optimal value of the adjustable parameter for scanning the object.

2. A method as recited in claim 1, wherein the adjustable parameter is an exposure time of the SLM system.

3. A method as recited in claim 1, further comprising scanning a second object, by SLM system, with the adjustable parameter set to the selected value.

4. A method as recited in claim 1, further comprising:
    generating the set of simulation data representing the simulated scan of the object by:
    accessing a digital model of the object;
    accessing camera data indicative of physical parameters of a plurality of cameras of the SLM system;

tracing rays from each camera of the plurality of cameras towards a virtualization of the object, based on the camera data, the virtualization of the object being defined according to the digital model of the object and being located at a measurement location relative to the SLM system;

identifying intersections of the rays with the virtualization of the object; and selecting intersections of the rays with the virtualization of the object for inclusion in the set of simulation data.

5. A method as recited in claim 1, wherein:

the set of simulation data comprises a plurality of simulation points;

each set of measurements of the plurality of sets of measurements comprises a plurality of measurement points; and the quality metric value for any particular test scan of the plurality of test scans comprises an average of distances between each simulation point of the plurality of simulation points and a nearest measurement point of the plurality of measurement points of the particular test scan.

6. A method as recited in claim 5, wherein the identifying of the particular test scan that has a quality metric value that satisfies the specified optimization criterion comprises:

identifying the test scan, of the plurality of test scans, that has the lowest quality metric value.

7. A method as recited in claim 1, further comprising:

identifying a plurality of sets of test scans from the plurality of test scans, each set of test scans including at least two test scans;

for each set of test scans of the plurality of sets of test scans, calculating a value of the quality metric based on the sets of measurements of the object associated with the set of test scans and the set of simulation data representing the simulated scan of the object by the SLM system;

identifying a set of test scans, of the plurality of sets of test scans, that has a quality metric value that satisfies the specified optimization criterion; and selecting values of the adjustable parameter that were used for the test scans of the identified set of test scans, as a set of optimal values of the adjustable parameter for scanning the object.

8. A system comprising:

a structured light metrology (SLM) scanner; and one or more processors operatively coupled to the SLM scanner and programmed to cause the system to:

cause the SLM scanner to acquire a plurality of sets of measurements of an object using an adjustable parameter of the SLM scanner, wherein a different value is used for the adjustable parameter for each of a plurality of test scans;

for each test scan of the plurality of test scans, compute a value of a quality metric, based on the set of measurements of the object associated with the test scan and a set of simulation data representing a simulated scan of the object by the SLM system, to produce a plurality of quality metric values;

identify a test scan, of the plurality of test scans, that has a quality metric value that satisfies a specified optimization criterion; and select a value of the adjustable parameter that was used for the identified test scan, as the optimal value of the adjustable parameter for scanning the object.

9. A system as recited in claim 8, wherein the adjustable parameter is an exposure time of the SLM scanner.

10. A system as recited in claim 8, wherein the one or more processors are programmed to cause the SLM scanner to scan a second object with the adjustable parameter set to the selected value.

11. A system as recited in claim 8, wherein the one or more processors are programmed to cause the system to:

generate the set of simulation data representing the simulated scan of the object by:

access a digital model of the object;

access camera data indicative of physical parameters of a plurality of cameras of the SLM system;

trace rays from each camera of the plurality of cameras towards a virtualization of the object, based on the camera data, the virtualization of the object being defined according to the digital model of the object and being located at a measurement location relative to the SLM scanner;

identify intersections of the rays with the virtualization of the object; and select intersections of the rays with the virtualization of the object to be included in the set of simulation data.

12. A system as recited in claim 8, wherein:

the set of simulation data comprises a plurality of simulation points;

each set of measurements of the plurality of sets of measurements comprises a plurality of measurement points; and the quality metric value for any particular test scan of the plurality of test scans comprises an average of distances between each simulation point of the plurality of simulation points and a nearest measurement point of the plurality of measurement points of the particular test scan.

13. A system as recited in claim 12, wherein the identifying the particular test scan that has a quality metric value that satisfies the specified optimization criterion comprises:

identifying the test scan, of the plurality of test scans, that has the lowest quality metric value.

14. A system as recited in claim 8, wherein the one or more processors are programmed to cause the system to:

identify a plurality of sets of test scans from the plurality of test scans, each set of test scans including at least two test scans;

for each set of test scans of the plurality of sets of test scans, compute a value of the quality metric based on the sets of measurements of the object associated with the set of test scans and the set of simulation data representing the simulated scan of the object by the SLM scanner, to produce a second plurality of quality metric values;

identify a set of test scans, of the plurality of sets of test scans, that has a second quality metric value that satisfies the specified optimization criterion; and select values of the adjustable parameter that were used for the test scans of the identified set of test scans, as a set of optimal values of the adjustable parameter for scanning the object.

15. An article of manufacture comprising instructions, execution of which by at least one processor in a processing system causes performance of operations including:

accessing a plurality of sets of measurements of an object, the plurality of sets of measurements having been acquired by a structured light metrology (SLM) system that has an adjustable parameter, wherein a different value was used for the adjustable parameter for each of a plurality of test scans;

for each test scan of the plurality of test scans, calculating a value of a quality metric, based on the set of measurements of the object associated with the test scan and a set of simulation data representing a simulated scan of the object by the SLM system;

identifying a test scan, of the plurality of test scans, that has a quality metric value that satisfies a specified optimization criterion; and selecting a value of the adjustable parameter that was used for the identified test scan, as the optimal value of the adjustable parameter for scanning the object.

16. An article of manufacture as recited in claim 15, wherein the adjustable parameter is an exposure time of the SLM system.

17. An article of manufacture as recited in claim 15, further comprising causing scanning of a second object, by SLM system, with the adjustable parameter set to the selected value.

18. An article of manufacture as recited in claim 15, wherein the operations further include:
generating the set of simulation data representing the simulated scan of the object by:
accessing a digital model of the object;
accessing camera data indicative of physical parameters of a plurality of cameras of the SLM system;
tracing rays from each camera of the plurality of cameras towards a virtualization of the object, based on the camera data, the virtualization of the object being defined according to the digital model of the object and being located at a measurement location relative to the SLM system;
identifying intersections of the rays with the virtualization of the object; and
selecting intersections of the rays with the virtualization of the object to be included in the set of simulation data.

19. An article of manufacture as recited in claim 15, wherein:
the set of simulation data comprises a plurality of simulation points;
each set of measurements of the plurality of sets of measurements comprises a plurality of measurement points; and
the quality metric value for any particular test scan of the plurality of test scans comprises an average of distances between each simulation point of the plurality of simulation points and a nearest measurement point of the plurality of measurement points of the particular test scan.

20. An article of manufacture as recited in claim 19, wherein the identifying of the particular test scan that has a quality metric value that satisfies the specified optimization criterion comprises:
identifying the test scan, of the plurality of test scans, that has the lowest quality metric value.

21. An article of manufacture as recited in claim 15, wherein the operations further include:
identifying a plurality of sets of test scans from the plurality of test scans, each set of test scans including at least two test scans;
for each set of test scans of the plurality of sets of test scans, calculating a value of the quality metric based on the sets of measurements of the object associated with the set of test scans and the set of simulation data representing the simulated scan of the object by the SLM system, to produce a second plurality of quality metric values;
identifying a set of test scans, of the plurality of sets of test scans, that has a second quality metric value that satisfies the specified optimization criterion; and
selecting values of the adjustable parameter that were used for the test scans of the identified set of test scans, as a set of optimal values of the adjustable parameter for scanning the object.

* * * * *